United States Patent [19]
Staton

[11] Patent Number: 5,311,722
[45] Date of Patent: May 17, 1994

[54] HANDLING AND LOADING BATCHES OF PRODUCTS ON EDGE

[76] Inventor: Colleen Staton, 1132 Orange Ave. East, St. Paul, Minn. 55106

[21] Appl. No.: 889,249

[22] Filed: May 28, 1992

[51] Int. Cl.⁵ .................. B65B 35/44; B65B 35/50; B65G 57/11
[52] U.S. Cl. .................... 53/443; 53/247; 53/252; 53/258; 53/542
[58] Field of Search ............... 53/443, 542, 531, 544, 53/258, 260, 255, 247, 252, 447

[56] References Cited

U.S. PATENT DOCUMENTS

| | | | |
|---|---|---|---|
| 4,590,743 | 5/1986 | Hardage | 53/542 X |
| 4,712,356 | 12/1987 | Hardage et al. | 53/542 X |
| 4,951,448 | 8/1990 | Schmechel | 53/542 X |
| 5,044,876 | 9/1991 | Stohlquist | 53/542 X |

Primary Examiner—James F. Coan
Attorney, Agent, or Firm—Jacobson and Johnson

[57] ABSTRACT

Products which are somewhat self-supporting are carried in tandem on a first conveyor toward a second conveyor with an edge of the product transverse to the direction of travel. When each product reaches the point of transfer between conveyors, it is transferred downwardly on edge onto the second conveyor and the products are reverse-shingled in batches on edge in a partially upright fashion on the second conveyor. Each batch of products is then moved on the second conveyor on edge by a loader for insertion into a container or for transfer to another device for further processing or handling. When inserted into a container, a wall of the container is temporarily bowed inwardly to guide the products while they are being loaded into the container.

16 Claims, 9 Drawing Sheets

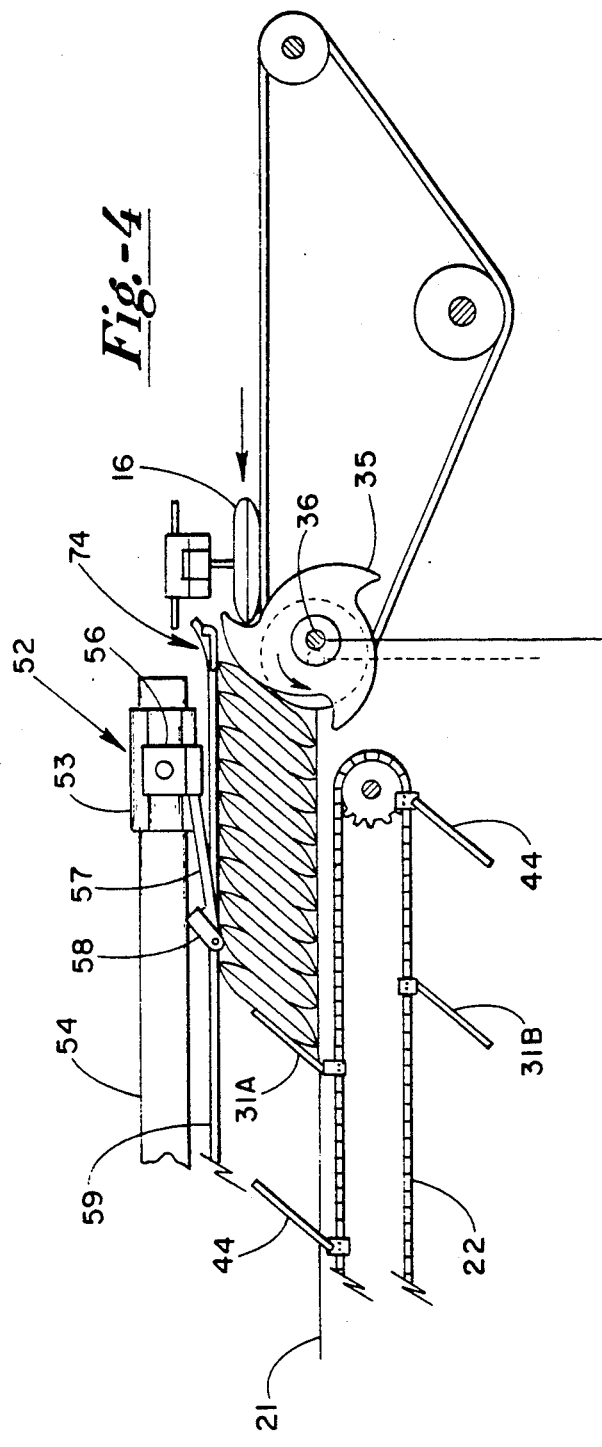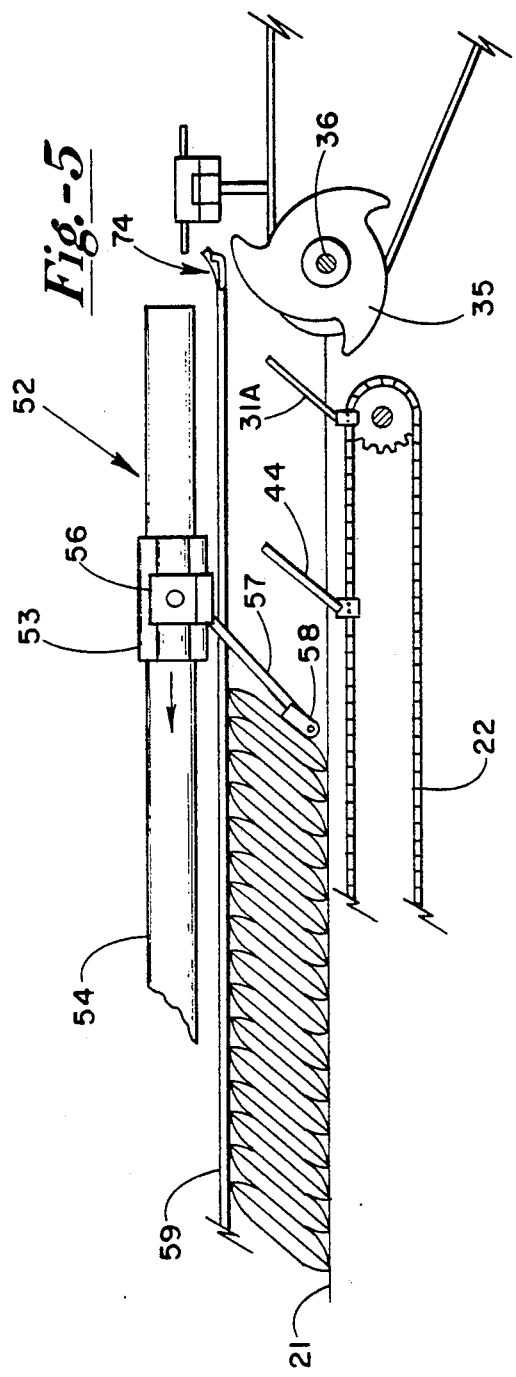

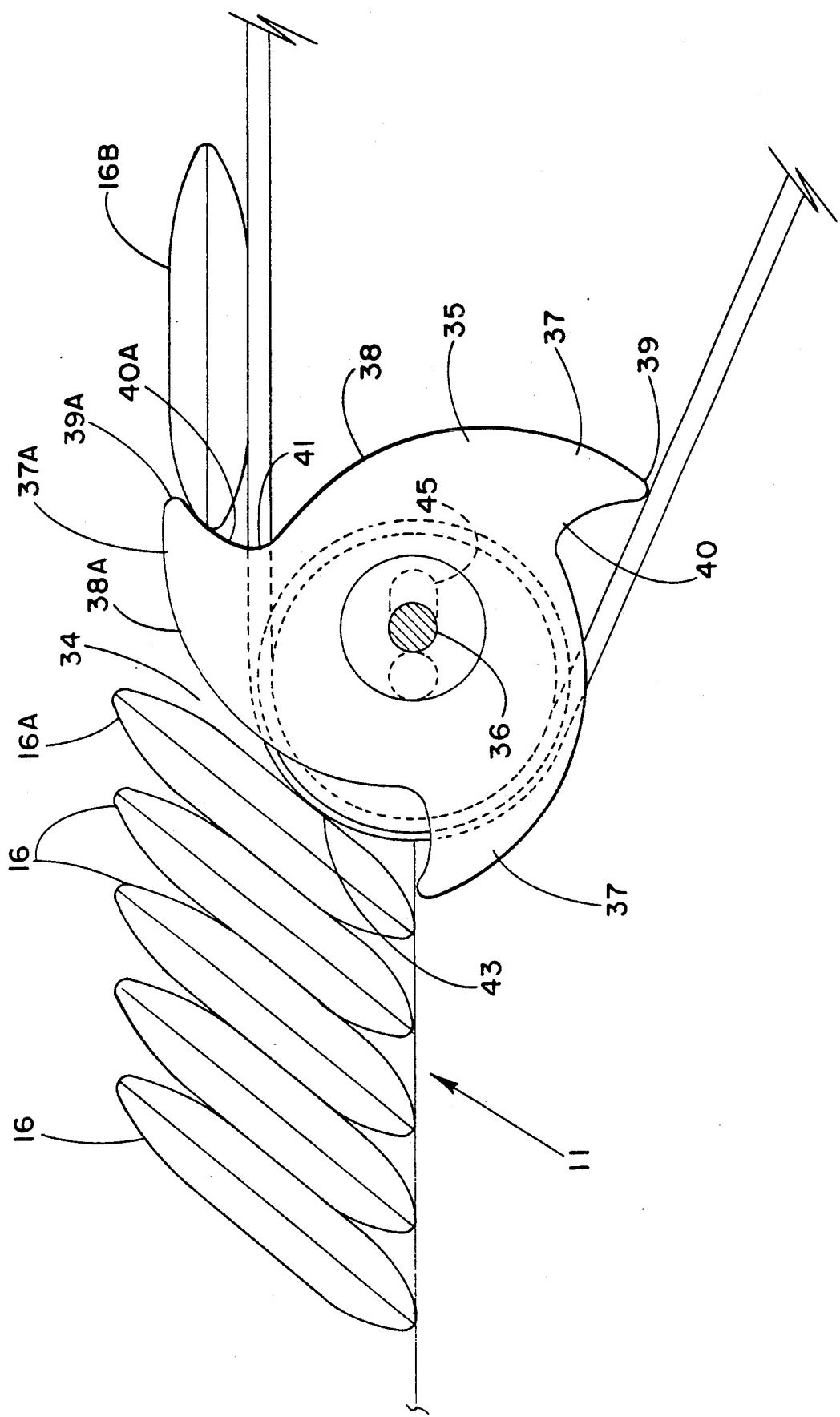

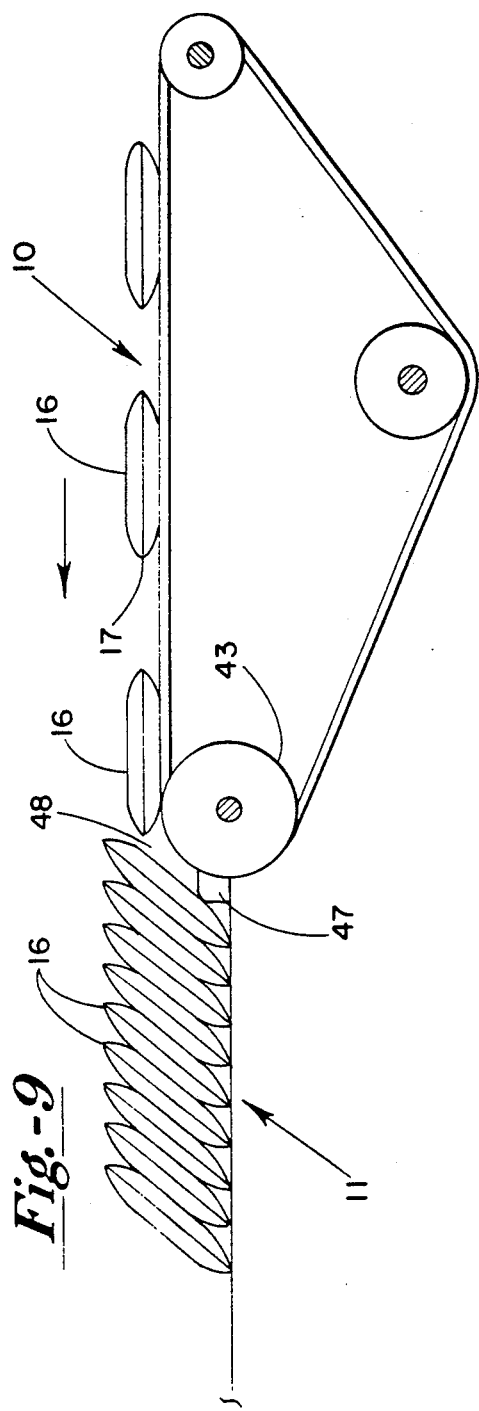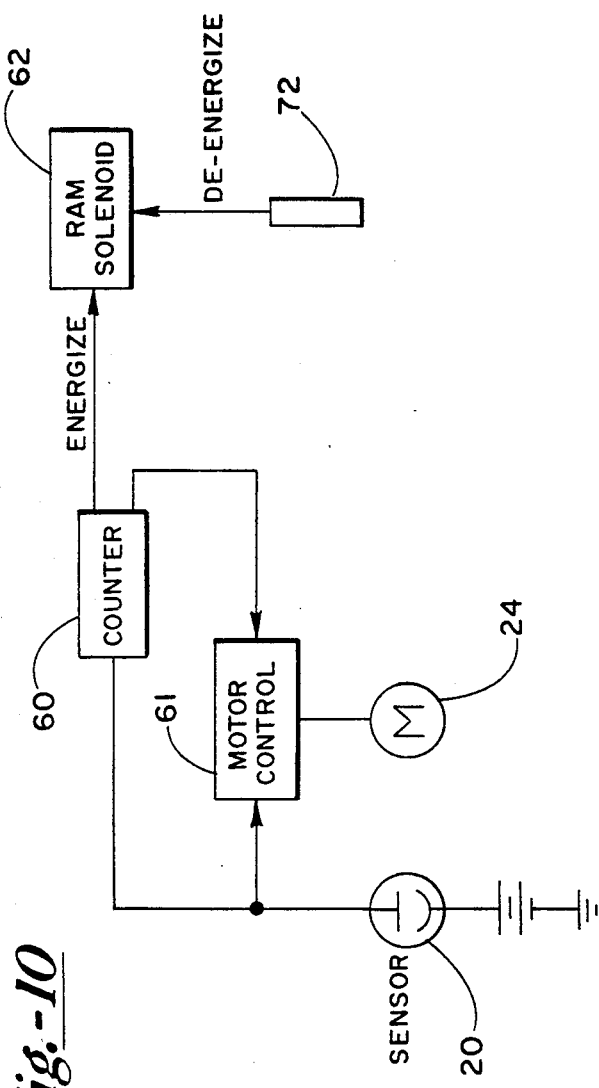

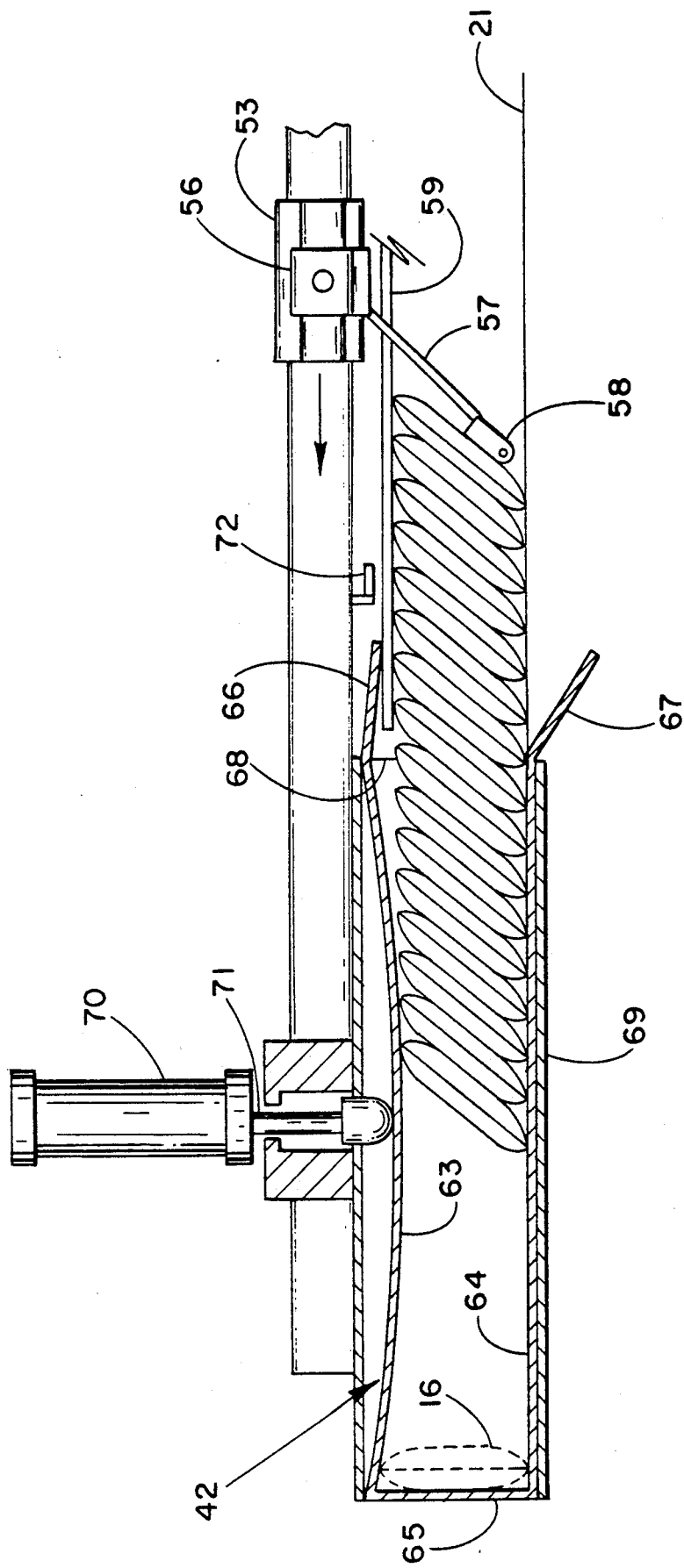

HANDLING AND LOADING BATCHES OF PRODUCTS ON EDGE

FIELD OF THE INVENTION

This invention is directed towards the general field of materials handling. More specifically, it is directed toward continuously collating and moving products on edge to place them into containers or to move them on for further processing. The product with which this invention is concerned is defined as one which has some degree of self-support when on edge, meaning that it can range from rigid to somewhat semi-rigid. It may be packaged or unpackaged. Its shape can range from thin and flat, e.g., pouches of soup or cocoa, to somewhat billowy or irregular shapes, such as pouches or bags of snack foods, microwave popcorn or packaged burritos. The product must have an edge that will support the product when the product is at least partially upright on edge. The foregoing generally defines the nature of "product" as used herein. Typical examples, no limitation thereto being intended, are packaged or unpackaged meat patties, pouches of microwave popcorn, frozen or non-frozen servings of various food items, paper products, blister or skin packs, etc. In general the product is an article which is generally available at retail stores and is not large in bulk or heavy in weight.

DESCRIPTION OF THE PRIOR ART

Some systems stack products of this nature one on top of the other in a box or other container and after the container is filled with a batch of products the opening through which the products are placed into the container is closed. In those systems in order to place the products on edge, the filled container is then turned on its side. If the product is somewhat fragile, stacking the products one on top of another may damage the products while they are being loaded into the container. Also, if the product is irregularly shaped it may be difficult to stack one on top of another in a container. Also, a relatively high stack may be difficult to manage. Furthermore, in systems of this nature oftentimes the container or carton is filled through one opening and after the container is filled that opening is permanently closed off with another covered opening used for later display and removal of the product. This creates another step in the loading process which adds to the cost and complexity.

Other systems for handling and loading products, of the nature as earlier defined herein, on edge usually require sophisticated mechanically integrated collating equipment such as buckets or compartments, or something similar, into which the products are placed for loading into a container. These systems require elaborate controls to provide close and accurate timing relationships between the buckets or compartments and the product feeding mechanisms. If this precise relationship is not met, these systems will jam. This places a limitation on the rate at which products can be handled. Further, if the number of products constituting a batch is changed or if the size, shape, product spacing, weight distribution, alignment or orientation of the product is changed, it usually is necessary to shut down the equipment for some time in order to change the size of the buckets or compartments and to change the timing relationships. One way to solve the problem of precise timing relationship between each product and the systems or equipment has been to use intermittent-based motion, typically via pneumatic or mechanical actuators which start and stop for each product that is received. These systems are slow, limited to handling not more than about one hundred fifty products per minute.

SUMMARY OF THE INVENTION

In accord with the present invention products, as defined earlier herein, are first carried one behind the other, i.e., in tandem, by a feeder conveyor or roll conveyor, which is usually continuously moving, with a leading edge of each product generally transverse to the direction of travel. A second conveyor, sometimes referred to as a rack conveyor, has an input end located physically below the output end of the first conveyor so that at the transfer point or area between conveyors the product is transferred downwardly from the output end of the first conveyor to the input end of the second conveyor with the leading edge resting on the latter. The rack conveyor has motor driven endless chains or belts. The operation of the motor is controlled in part by a sensor, such as an electric eye located at or near the transfer point or area between the two conveyors to keep the rack conveyor moving as long as product is present at or nearing the transfer point. The sensor also feeds a signal to a counter to count the number of products appearing at the output end of the roll conveyor, i.e., the transfer area.

A plurality of keeper lugs are spaced apart along the endless chains of the rack conveyor. The keeper lugs must be far enough apart so that a batch of products can be accumulated between successive keeper lugs. At least partly controlled by the sensor, the motor drives the rack conveyor so that a keeper lug is brought into position to contact and restrain the leading edge of the first product of a batch of products which reaches the rack conveyor. The motor continues to advance the conveyor chain provided that the sensor does not detect the absence of a product at or near the transfer point. As the chain advances the next product that reaches the transfer point is transferred downwardly to the second conveyor behind the preceding product so that the products are reverse-shingled on edge in a partially upright or partially erect position on the rack conveyor. A mechanism is provided to create a controllable open space for each successive product to be placed onto the rack conveyor, in the manner as described, by forming a pocket or opening or slot behind, i.e., upstream of, each product at the transfer point. The next successive product engages or slips into the pocket and then becomes part of the reverse-shingled batch on the rack conveyor. Some products may start to reverse-shingle at the input of the rack conveyor at other than suitable angulation. To counter this, a tilt detector is provided which will detect if this should start to happen and cause the rack conveyor motor to speed up or slow down so that any such products will reverse-shingle fairly uniformly at about or close to the desired or preferred angle.

When the counter reaches a total equal to the preset number of products in a batch, the motor is speeded up to move the rack conveyor chain more quickly to bring a pusher arm or lug, which is mounted on the chain, up against the backside (upstream side) of the last product of the batch which is on edge on the chain, to separate the batch from the continuously incoming products while keeping the entire batch of products on edge on the second conveyor and moving the entire reverse-shingled batch on edge towards the output end of the second conveyor. Concurrently a keeper lug is brought into position to contact and restrain the leading edge of the first product of the next batch of products that reaches the rack conveyor at the transfer point. In some cases a single lug may be used to serve the function of both a keeper lug and a pusher arm or lug. Lastly, a mechanism is provided to trigger the operation of a loader mechanism, such as a ram, to take over from the pusher arm or lug to continue to move the reverse-shingled batch of products on edge to the output end of the rack conveyor to load the batch into a container or move it to other machinery or apparatus for further processing. In this fashion the products are continuously collated and loaded into containers or onto other apparatus for further processing. When the apparatus is used for loading a batch of products on edge into a container, a hold-down bar -and a container bowing mechanism are provided to guide and control the products into the container.

Recognizing the above-mentioned problems and disadvantages of the prior art, it is an object of the invention to substantially increase, e.g., by more than double, the speed of handling and loading on edge products of the nature described earlier. This is achieved even though the products may not be precisely spaced, aligned, or oriented, or if the products are irregularly shaped. In particular, these features are achieved even if products from two production lines are combined into one stream of products and the characteristics of the products from each line differ from one another.

Another object of the invention is to provide a controllable open space that is created when the product is sensed, even though incoming product presence and spacing is random and products may have different physical characteristics. This is to permit flexibility to accommodate "real-world" situations in material handling and to provide diversity for end-users of this type of equipment.

It is a further object of this invention to provide an economical loading process which is based on end loading to minimize material usage and reduce solid waste. End loading style equipment reduces the blank size required and permits the integration of the display opening features within the closing design of the blank or container. This, in turn, requires less diecutting which otherwise might weaken the container.

BRIEF DESCRIPTION OF THE DRAWING

FIG. 4 is a somewhat enlarged view of the transfer point or area between conveyors functionally illustrating product transfer from the roll conveyor output to the rack conveyor input;

FIG. 5 is a somewhat simplified view functionally illustrating the operation of a ram for pushing a batch of products on edge for loading into a container;

FIG. 6 is an enlarged view to illustrate the operation of the pocket wheel at the transfer area;

FIG. 9 is a simplified enlarged view functionally illustrating an alternative to the pocket wheel at the transfer area:

FIG. 10 is a simplified block diagram of the electrical control circuitry;

FIG. 11 is a side view showing a preferred manner of inserting a batch of products on edge into a container.

DESCRIPTION OF THE PREFERRED EMBODIMENTS

Figure 2:
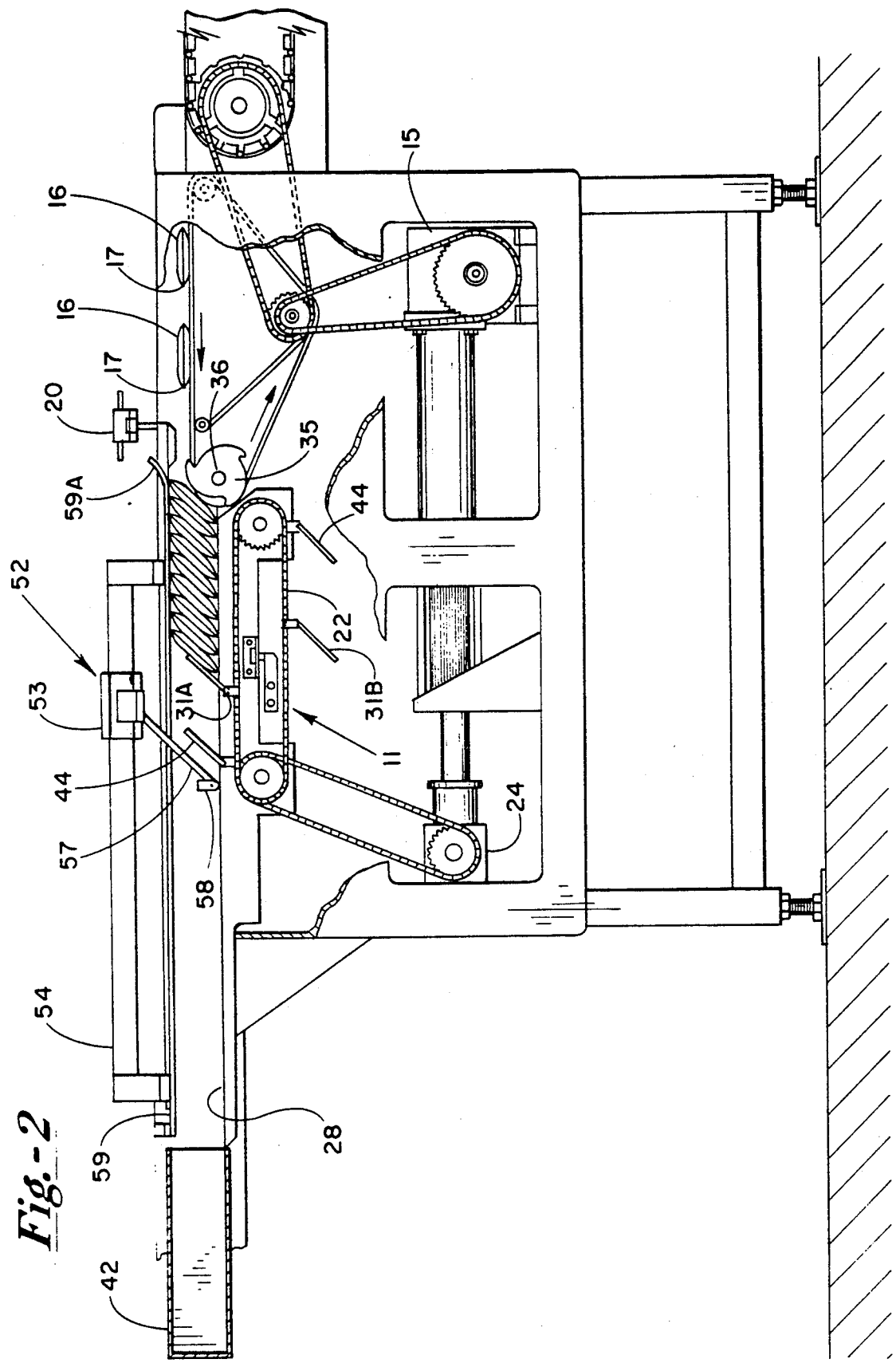
FIG. 2 is a side plan view of a preferred embodiment of the invention.

The preferred embodiment of this invention utilizes two conveyors. One is an endless belt feeder conveyor, sometimes referred to as the roll conveyor, which is identified generally by reference numeral 10 and the other conveyor 11 having an endless chain and belt sometimes referred to as a rack conveyor. The endless belt on conveyor 10 preferably comprises three spaced-apart parallel separate endless belts 12, 13 and 14 which are suitably driven by motor 15 coupled in conventional fashion through a series of chains and sprockets to move belts 12, 13 and 14 continuously at a predetermined fixed rate to carry products downstream, i.e., right to left as observed in FIG. 2, towards the output end of conveyor 10. The means by which products are placed on conveyor 10 does not constitute a part of the instant invention and so is not described. To be used as an example for the purpose of describing the invention, the product shown in the drawings and identified by reference numeral 16 is a pouch laying on conveyor 10 with a side resting on one or more of belts 12, 13 and 14 while being carried downstream. For illustrative purposes only, the outer edge of product 16 is generally rectangular, no limitation thereto being intended. As mentioned earlier, product 16 can be in a wide variety of shapes and sizes provided it falls within certain boundaries as defined earlier herein. In general, a large quantity of products 16 are placed on and carried downstream by conveyor 10 in tandem with each product having a leading or downstream edge 17 arranged generally parallel to the leading edge of the other products and being generally transverse to the direction of travel.

The input end of conveyor 11 is located below the level of the output end of roll conveyor 10 at the product transfer point or area between conveyors so that when a product 16 reaches the output end of roll conveyor 10 the product is transferred downwardly from one conveyor to the other so that the leading edge 17 contacts conveyor 11 at its input end. A suitable sensor 20, preferably a conventional electric eye, which may be mounted in any convenient fashion is located at or near the output end of conveyor 10 to detect products 16 at or as they approach the transfer point or area between the two conveyors. A signal from sensor 20 indicating the absence of a product within a certain time period based upon a predetermined incoming product rate will stop rack conveyor 11. Also, a suitable signal is sent from sensor 20 to a conventional electronic counter each time a product is detected by sensor 20 and the counter totals up the number of products reaching the transfer point.

Figure 7:
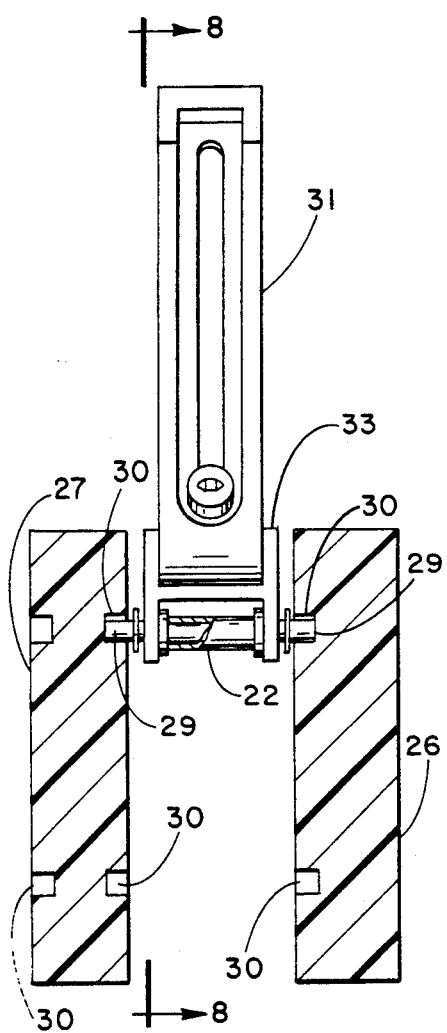
FIG. 7 is a partially sectioned somewhat enlarged view illustrating a keeper lug attached to the rack conveyor chain.

Rack conveyor 11 has a pair of transversely-spaced endless chains 22 which are driven in conventional fashion via suitable pulleys and/or sprockets by a motor 24. Chains 22 run between three transversely spaced solid elongated beams or bars 26, 27 and 28 which have highly finished top surfaces, to provide a smooth floor or bed 21 for products 16 to move on, in a fashion to be described later. Crosspins 29 extend out the sides of the links of chains 22 to engage slotted tracks 30 in the facing sides of bars 26, 27 and 28 below floor 21 to guide the travel of chains 22 (see FIG. 7).

Figure 8:
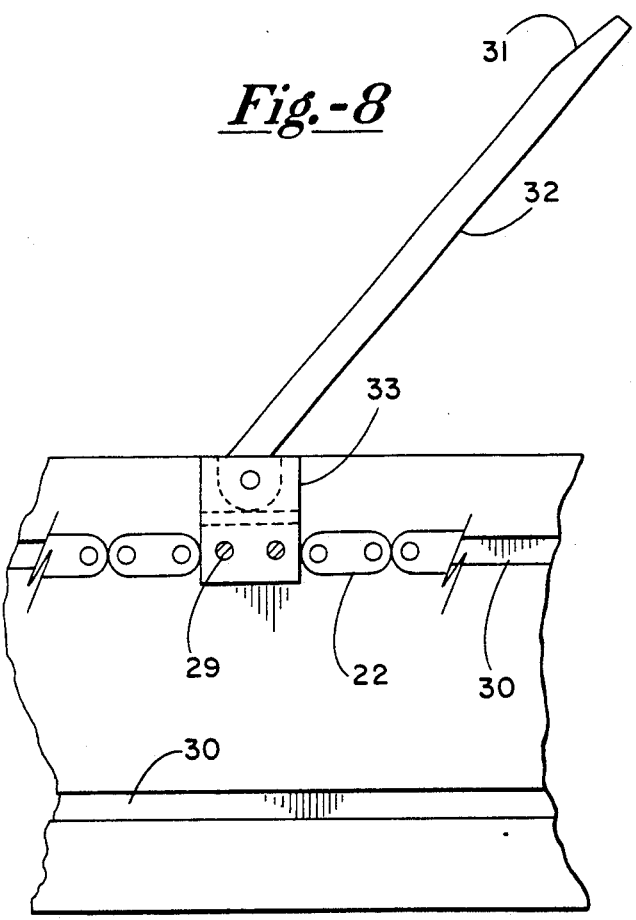
FIG. 8 is another view of the keeper lug attachment as seen along viewing line 8—8 of FIG. 7.

Mounted on chains 22 are a pair of identical keeper lugs 31 which, for descriptive purposes, are designated 31A and 31B. Although in general there may be more than two keeper lugs on conveyor 11, for illustrative purposes only two keeper lugs are shown. Preferably keeper lugs 31 are mounted on chains 22 in a fashion such that they can be easily and quickly moved from one location to another on chains 22. Typically they may be attached by an H-shaped bracket 33 which is removably clipped or fastened in some convenient manner to cross-pin 29 of chain 22 at one of the chain links to extend above the top surfaces 21 of bars 26, 27 and 28 when on the upper horizontal reach of chains 22, see FIGS. 7 and 8. It has been found that the keeper lug 31 should be angled backward (opposite the direction of travel), preferably at about forty-five degrees to control the path of the first bag of a batch and start the shingled pattern. Each keeper lug 31 has a generally flat front face 32. Keeper lugs 31A and 31B are located on chains 22 so that one of them is at the input end of conveyor 11 when the first product 16 of a batch of products reaches the transfer point between conveyors. A batch is defined as a group or a predetermined number of reverse-shingled products which are intended to be loaded on edge into a container or onto another device for further processing. When the leading edge 17 of said first-of-a-batch product reaches conveyor 11 it is transferred downward onto conveyor 11 to contact or rest against a keeper lug 31A or 31B which restrains the product from falling flat on conveyor 11 so that the product is retained partially upright at an angle ranging from about thirty degrees to about eighty-five degrees. This angle is based on the mass of the product and its transfer of inertia. Successive products are transferred downwardly from conveyor 10 to conveyor 11 in the same manner in a partially upright position one behind the other while chains 22 advance so that a number of products are reverse-shingled on edge angularly or partially upright behind the keeper lug, see FIGS. 2 and 4. Preferably motor 24 is operated to continuously drive endless chains 22 so that the products continuously reverse shingle on conveyor 11 in the described manner. However, the absence of a product at or approaching the transfer point or area without a certain time frame will be detected by sensor 20 resulting in motor 24 and conveyor 11 being stopped until the next product arrives at or is detected as approaching the transfer point. Alternatively, motor 24 may be a stepping motor which is controlled to advance chains 22 a short distance and then stop for each product detected by sensor 20.

To assist the transfer of products from conveyor 10 to conveyor 11, preferably a freely rotatable wheel 35, usually referred to as a pocket wheel, is mounted at the transfer point between conveyors 10 and 11. The function of wheel 35 is to help form an opening or pocket behind the rearmost reverse-shingled product on conveyor 11 to ensure that the next product arriving at the transfer point from conveyor 10 transfers properly into place onto conveyor 11 in a reverse-shingled manner.

As best seen in FIG. 6, the profile of pocket wheel 35 resembles that of a pin wheel. It has a plurality of identical radially extending lobes, generally designated by reference numeral 37, which are equally circumferentially spaced around its outer edge. It should be understood that the specific shape of wheel 35, such as the size of the lobes, curvatures, etc., may be changed for any given application. A number of factors will affect the shape of the various parts of pocket wheel 35. These factors may include the shape and size of the product as well as the feed or transfer rate. However, the pocket wheel will have the general shape as shown in the drawing and described herein. In the embodiment shown, wheel 35 has three lobes 37. Each lobe 37 has a continuous edge having a first curved or arcuate cam-shaped or convex section 38 extending to a point generally designated by reference numeral 39 and then continues with a concave section 40 which extends generally sharply radially inward from 39 until it reaches the start of the arcuate convex cam section 38 of an adjacent lobe 37 at about 41.

The function of wheel 35 is illustrated most clearly in FIG. 6. The last reverse-shingled product resting partially upright on edge on conveyor 11, designated by reference numeral 16A, has its back or upstream side resting against pulleys 43 of belts 12 and 14 of conveyor 10 at the output end of conveyor 10. There may be a small gap or space 34 between product 16A and convex edge section 38A of wheel 35, as shown in FIG. 6, or product 16A may be resting with its backside against edge section 38A, depending on the amount of tilt of the product on conveyor 11. In any event, the next successive product, designated as 16B, which reaches the output end of conveyor 10 contacts or engages concave edge section 40A of lobe 37A on wheel 35 to rotate wheel 35 in the direction of travel of the products, i.e., counterclockwise (as observed in FIG. 6) so that convex edge 38A contacts the backside of rearmost product 16A on conveyor 11 and, in conjunction with the movement of the chains on conveyor 11, causes a pocket or opening or space 34 to be formed just behind the reverse-shingled product on conveyor 11 to assist in transferring the next product, 16B, into place on edge reverse-shingled in a partially upright position on conveyor 11. Wheel 35 will continue rotating counterclockwise until tip 39A of lobe 37A reaches a position just below the edge of product 16B which will now be resting on conveyor 11 where product 16A had been so that wheel 35 is ready to respond in similar fashion to the next product that reaches the output end of conveyor 10. In this fashion wheel 35 automatically indexes itself to be able to direct the products onto conveyor 11. At fast feed rates the inertia of wheel 35 may result in wheel 35 continuing to rotate with a velocity such that cam edge 38 strikes the back or upstream side of the last product on conveyor 11 causing wheel 35 to bounce back, i.e., to try to rotate clockwise. However, tip 39 would then contact the bottom edge of the product on conveyor 11 to prevent any significant rebounding or clockwise rotation of wheel 35 so it will stay in position to be ready for the next incoming product. The axle or shaft 36 of pocket wheel 35 is mounted in a slotted opening 45, shown by dashed or phantom line (shown only in FIG. 6 for clarity), in a suitable bracket which is deleted for clarity. The slotted opening permits wheel 35 to be adjustably positioned toward or away from roll conveyor pulley 43 to accommodate different products. Once the optimum location is determined for a given product or family of products, the shaft is locked into place in some convenient fashion. This adjustment contributes to positive reverse-shingling of the products by affecting the size of space or gap 34 and the time at which each product engages pocket wheel 35. If the lobes 37 on wheel 35 have too much influence on the product, it could cause wheel 35 to stall. To combat this, wheel 35 would be moved back away from the input end of conveyor 11. Also, by adjusting the location of pocket wheel 35 the length of time that the product engages the concave area 40 of pocket wheel 35 can be adjusted which can be used to improve the transfer to the rack conveyor of lightweight products or when products are being slowly inputted by the roll conveyor.

Figure 3:
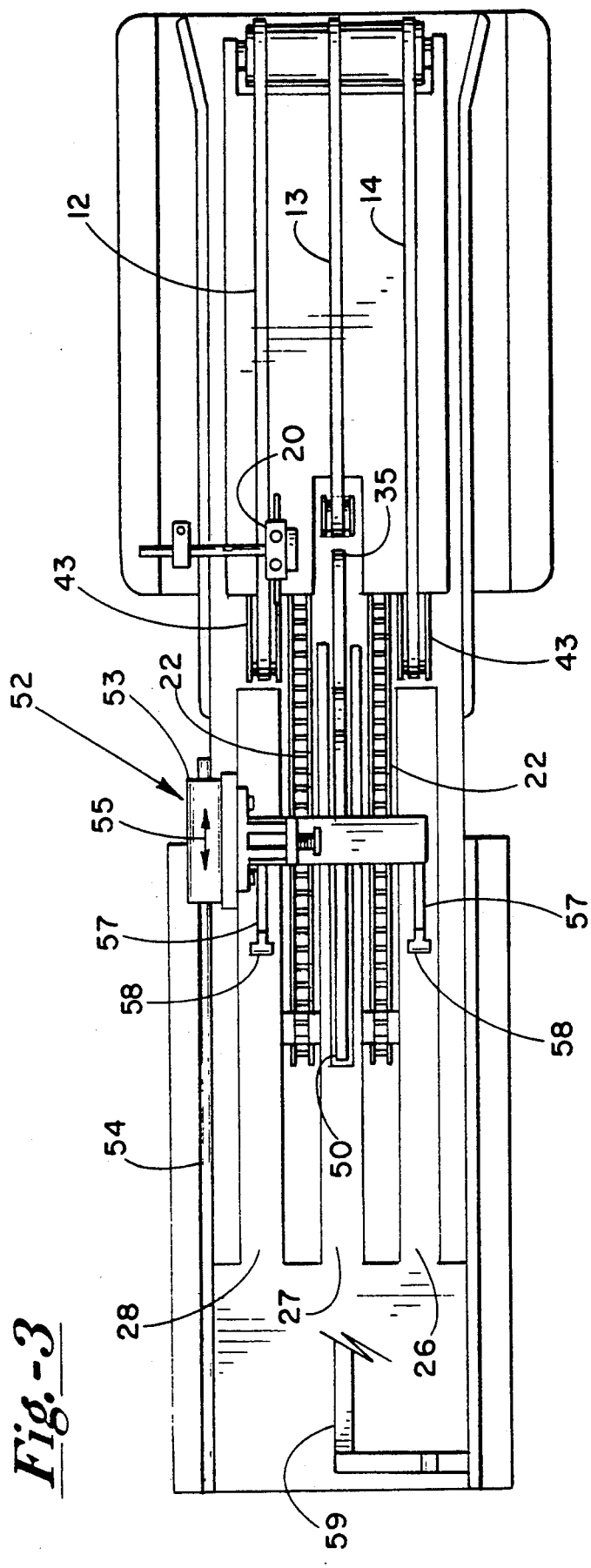
FIG. 3 is a top plan view.

The shape of pocket wheel 35, the shape of the product 16, and the motion imparted by pulleys 43 and/or belts 12, 13 and 14 all combine to contribute to positive reverse-shingling of the products in a partially upright position on conveyor 11 at a wide range of input feed rates or spacings. The subsequent action of moving the reverse-shingled batch of products on conveyor 11 keeps the products partially upright on edge for loading into a container or for transferring to another machine or other apparatus for further processing or handling. It has also been found that an endless belt 50 (FIG. 3) of some suitable material in contact with the bottom edge of the products on conveyor 11 which is driven in some conventional fashion, e.g., by the same motor 24 which drives chains 22 or by a separate motor, aids in the reverse-shingling of the products as they leave conveyor 10 and are transferred onto conveyor 11. In practice, friction belt 50 may actually be two or more separate transversely-spaced belts. The downstream movement of belt 50 keeps the bottom edge of the products moving downstream to help assure that they will reverse-shingle at the desired angle.

Figure 1:
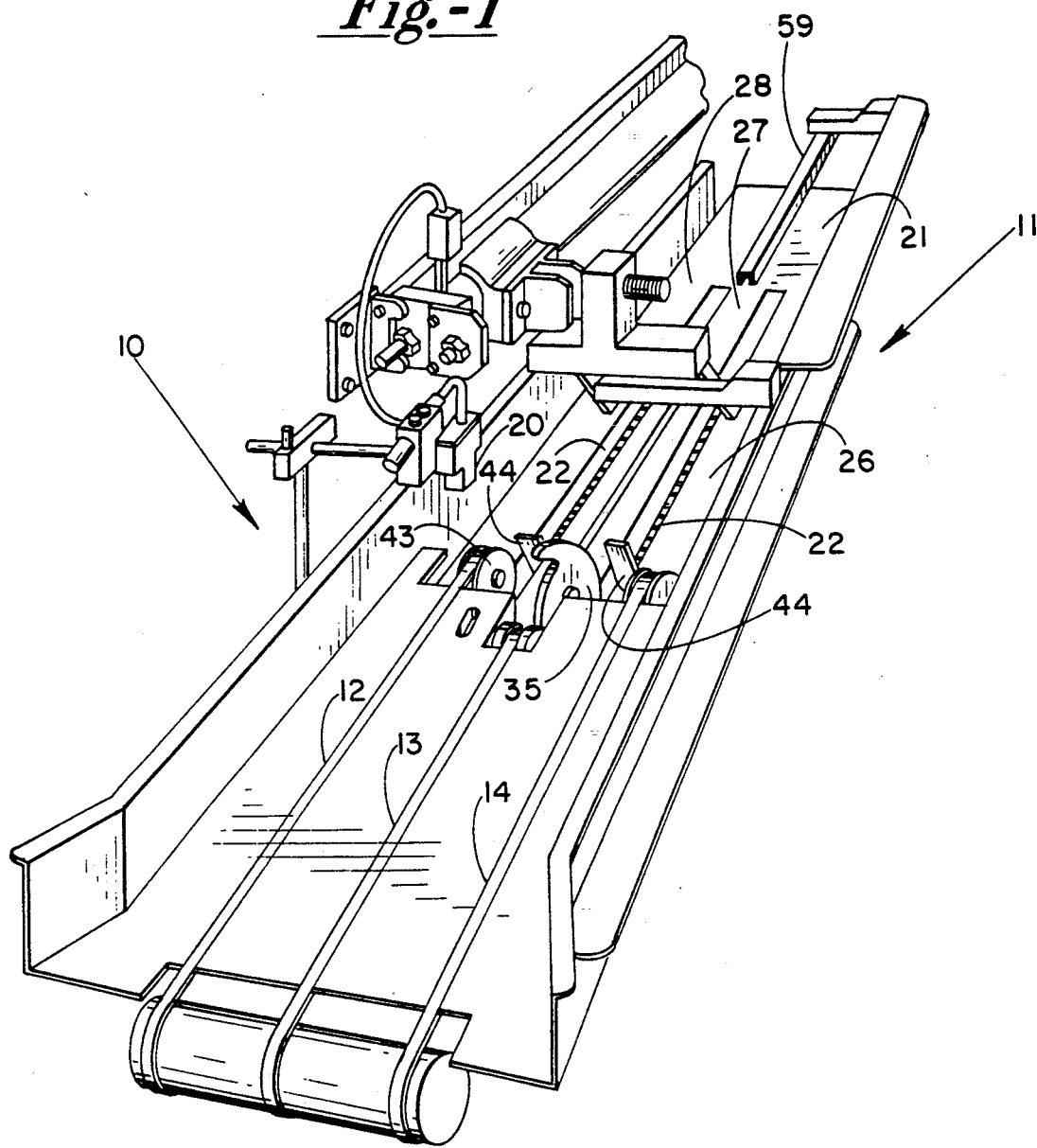
FIG. 1 is a perspective view of a preferred embodiment of the invention looking down at the input end.

A mechanism for separating the products on conveyor 1 into batches comprises pusher arms 44 attached to chains 22 of conveyor 11 interspersed between the keeper lugs 31. Pusher arms 44 are rigid strips or bands attached in some convenient fashion to chains 22. For example, no limitation thereto intended, pusher arms 44 may be detachably secured to links of chains 22 similar to the way keeper lugs 31 are attached. Pusher arms 44 are angled outward from chains 22 and rearward or upstream with respect to the direction of travel of the upper reach of chains 22 at about the same angle, preferably about 45 degrees, as keeper lugs 31. Preferably, the pusher lugs are also about the same length as the keeper lugs. As illustrated in FIG. 1, pusher arms 44 are arranged to comb through or alongside belts 12 and 14 (and their associated pulleys) of conveyor 10 at the product transfer point. In response to electrical signals from electric-eye sensor 20, which detects the presence of a product at the transfer area or approaching the transfer area, a counter 60, see FIG. 10, counts up the number of products. When that number reaches a predetermined quantity equal to the number of products which constitutes a batch of products, a signal is sent from counter 60 to control box 61 for motor 24 to speed up motor 24 to accelerate the travel of chains 22 to bring one set of the pusher arms 44 up against the rearward or upstream side of the last product 16 to reach conveyor 11 (which constitutes the last product of a batch of reverse-shingled products on edge on conveyor 11). The pusher arm pushes the batch of products so the products move on edge along bed or floor 21 (formed by the top surfaces of bars 26, 27 and 28) and along or over belt 50 downstream towards the output end of conveyor 11. Simultaneously, a keeper lug 31 on chain 22 is brought into position at the input end of conveyor 11 so that the leading edge 17 of the next product 16 that reaches the transfer point, which product constitutes the first product of the next batch of products, is retained in place on chains 22 to hold the product partly upright in the manner as described earlier. The next signal from counter 60 to motor control 61, indicating that products have accumulated on conveyor 11 to form another batch, causes motor 24 to advance chain 22 to bring the next set of pusher arms 44 into action to move the next batch downstream and bring another keeper lug 31 into place to start another batch. The cycle of operation is continuously repeated in the fashion described to provide a continuous collating loader by accumulating products resting on edge into batches and moving the separate reverse-shingled batches on edge toward containers or other handling apparatus at the output end of conveyor 11.

The functions of the keeper lug and pusher lug may be combined into a single lug so that the number of lugs on a chain can be halved. The back side of the pusher lug acting on or pushing a batch of products will then serve the function of the keeper lug for the next successive batch of products.

FIG. 9 illustrates an alternative means for providing assistance to ensure that each successive product will fall into place on conveyor 11. This comprises an extension in the form of a pad or rigid support 47, sometimes referred to as a bull nose, attached to outer rails 26 and 28 at the output end of roll conveyor 10 which extends downstream past pulley 43. The rearmost or the most upstream product 16 on conveyor 11 rests in its partially upright position against bull nose 47 so that there is a pocket or space or gap 48 between pulley 43 (and its associated belt) and the rear surface of the product so that when the next product reaches the transfer point or the output end of conveyor 10, its leading edge will fall into pocket or space 48. Combined with the continuing or repetitive movement of conveyor 11 this will assist in properly reverse-shingling each successive product on edge in a partially upright position on conveyor 11.

After the products have been separated into batches and kept reverse-shingled partly upright and have been moved downstream on edge, keeper lug 3 which is in contact with the edge of the first product of a batch eventually gets to the end of the top reach of chain 22 and moves downward with chain 22 out of the way to be eventually returned to the input end of conveyor 11. At about that time, or just prior thereto, a loading device takes over to move the batch of products on edge further downstream to place it into a container 42 or onto another piece of equipment for further processing. The loading device can be of various forms. For example, it may utilize an overhead rotary motion or a reciprocating action. One form of loading device is a ram, generally designated by reference numeral 52. Ram 52 is reciprocably slidably mounted in some convenient fashion above conveyor 11, for example, on elongated bar or rail 54, which is attached in some conventional manner to the frame of conveyor 11. It has a main carriage 53 whose operation is controlled by electrical solenoids, not shown physically in the drawings but identified by reference numeral 62 in the schematic FIG. 10. Carriage 53 is operated to move reciprocably, as illustrated by arrows 55 (FIG. 3), in line with conveyor 11 on rail or bar 54. Attached to carriage 53 and jutting out over the chains of conveyor 11 is a rigid ram leg holder 56 (FIG. 11). A pair of ram legs 57 extend forward or downstream of and downward from the ends of holder 56. Ram legs 57 are pivotably attached to holder 56 so they can swing down toward bed 21 or up to pass over or rest on the upper edge of the products on conveyor 11. At the front ends of ram legs 57 are pivotably attached feet 58. Leg 57 and foot 58 are designed and dimensioned such that when leg 57 is in its lowest or furthest downward position the bottom edge of foot 58 is slightly above bed or floor 21 so that foot 58 does not quite reach bed 21. As best illustrated in FIG. 4, while a group of products 16 are being formed into a batch, ram 52 is in its starting or furthest upstream position and ram leg 57 is pivotally raised or elevated and rests on or above the top edge of the products on conveyor 11. FIG. 5 illustrates the batch of products being moved downstream by ram 52. Pusher arms 44 separate a group of products into a batch on edge so that there is a gap rearward or upstream of the batch of products on conveyor 11 (in the manner as described earlier) so that the pivotal connection of ram leg 57 to holder 56 allows leg 57 to drop down toward bed 21 and solenoid 62 is energized to move carriage 53 downstream so that foot 58 contacts the rearmost product in the batch of products to push the batch downstream. When the batch reaches its destination, either by being loaded into a suitable container or placed into or on another apparatus for further processing, carriage 53 is withdrawn back upstream towards its starting position and leg 57 rides on the top of the next group of products on conveyor 11 to get ready to repeat the operation for the next and each successive batch of products. Carriage 53 may be driven in some conventional manner such as pneumatically or electrically. Solenoid 62 for ram carriage 53 ordinarily is energized by the same signal from counter 60 that causes motor 24 to advance chains 22 to bring pusher arms 44 into play but momentarily delayed so that the pusher arms 44 initially move a batch of products downstream away from the start of the next batch of products to create the gap that allows ram legs 57 to be brought into place to advance the batch of products to the downstream destination when moved by carriage 53.

The products on conveyor 11 are kept partially upright but at an angle with respect to floor or bed 21 by a holddown bar 59 which is attached in some convenient fashion to the frame of conveyor 11. Holddown bar 59 is an elongated strap or bar or channel of some suitable rigid material which extends substantially over the length of the floor or bed 21 of conveyor 11 and is elevated so that the top edge of the products contact the underside of holddown bar 59 and thereby are retained at an angle with respect to bed or floor 21 as they are moved downstream. Preliminary results have indicated that the preferred angle that the product makes with respect to floor or bed 21 is in the range of about thirty degrees to about eighty-five degrees.

FIG. 11 illustrates a manner of inserting the batch of products on edge into container 42. Conventionally, container 42 is made out of some suitable relatively stiff yet somewhat flexible material such as paperboard or corrugated with a chamber for receiving the products surrounded by top and bottom walls or panels 63 and 64, respectively, side walls or panels, a closed back wall or panel 65 and having an upper flap 66 and a lower flap 67 for covering front opening 68. Container 42 rests on a suitable support plate 69 and upper flap 66 rests on or above the top of holddown bar 59 and lower flap 67 is angled downward below the level of floor or bed surface 21 so that the flaps do not interfere with the injection of the product into the container. In some cases there may be only one flap at the front opening 68. Above the top panel 63 of carton or container 42 is a cylinder 70 with a movable piston 71 directed downward onto the top panel 63. When piston 71 is moved downward, as illustrated in FIG. 11, it causes top panel 63 to bow inward to a level about the same distance as holddown bar 59 is elevated above bed or floor 21. This provides a guide to retain the products in their partially upright reverse shingled condition as they enter and while they are being moved in container 42. When ram carriage 53 reaches a certain point of travel it activates a switch 72 which then sends a signal to cylinder 70 to withdraw piston 71 so that the top panel 63 is allowed to return to its normal condition. This occurs just about at the time that the front product of the batch of products reaches the rear wall 65 of the carton, as illustrated and shown by dashed lines in FIG. 11. It then takes just a slight further downstream advancement of ram carriage 53 for all of the products to be straightened up so that they are virtually totally upright in container 42. The same signal that is sent to cylinder 70 is delayed momentarily and is sent to the solenoid which actuates carriage 53 to withdraw the ram. In some fashion, not constituting a part of the instant invention, flaps 66 and 67 are closed together and the filled container is moved away and replaced with an empty container so that the next batch of products can be inserted. When an empty carton or container is brought into place cylinder 70 is again actuated and piston 71 extends downward to bow the top panel of the container.

A feature of the invention is that the system can be easily and quickly adapted to different products, different product sizes and batch counts. For example, if the size or the bulk of the product is changed or if the number of products in a batch of products is changed, if necessary keeper lugs 31 and associated pusher arms 44 merely have to be folded up or down on chains 22 or unhooked and reattached at new locations on chains 22.

Figure 12:
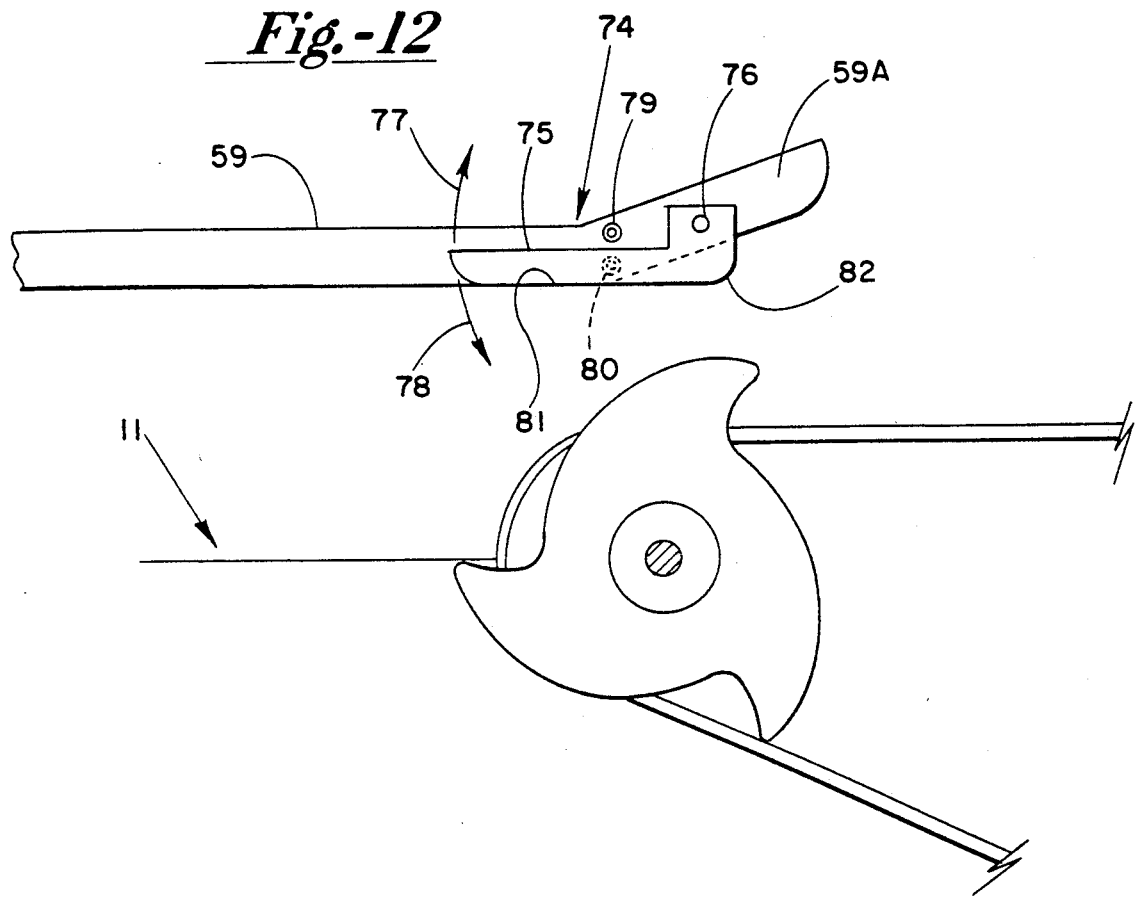
FIG. 12 is a simplified enlarged view of the transfer area illustrating a tilt detector used in a preferred embodiment of the invention.

As mentioned earlier, the nature of some of the products that will be handled by the present system is such that they may bunch up or compress so that they may tend to reverse-shingle at other than a preferred angulation when they leave the roll conveyor and transfer to the rack conveyor. In general it has been found that the first few products forming a batch usually reverse-shingle quite well but the nature of the product may be such that the latter ones of a batch may tend to bunch up so that they are at an undesirable angle. To counter this, a tilt detector, generally identified by reference numeral 74, may be provided. For clarity, tilt detector 74 is not shown in all of the figures. As shown most clearly in FIG. 12, tilt detector 74 comprises an arm 75 pivotally attached at 76 to hold down bar 59 which is bent or curved upward at 59A at the transfer area. Arm 75 can swing upward or downward as shown respectively by directional arrows 77 and 78. A pair of sensors 79 and 80, which may be, for example, conventional electric eyes or any other type of suitable sensing device, is also located in some convenient fashion on hold down bar 59 to work in conjunction with arm 75. When the incoming products, not shown in FIG. 12 for clarity, reach and transfer to rack conveyor 11 at a generally desirable or correct angle so that they will be properly handled by rack conveyor 11, the products will act on arm 75 so that its lower edge 81 will generally be at the same level as the bottom edge of hold down bar 59, as illustrated in FIG. 12. Arm 75 then will be over or block off sensor 80 but not sensor 79. This is the condition of no corrective action being necessary. Should the angle of the products at the transfer area or transfer point between the two conveyors be too upright, i.e., significantly greater than the preferred angle, the upper edge of the product will strike the rearward or upstream section 82 of arm 75 to cause it to swing upward about pivot point 76 to uncover sensor 80 and cover sensor 79. This will produce a signal which is sent to the motor 24 to at least momentarily speed up the movement of chains 22 on conveyor 11. This acts on the incoming products to cause them to tilt backwards toward the desired angle and away from the upright position. In general, the system will not react to a single product being too upright. The circuitry is designed to integrate the signals to the motor so that only a number of successive upright products, which is evidence of a tendency of the products to be too upright, will result in a signal being sent to speed up conveyor motor 24. In a somewhat similar fashion, if the products should show signs of tilting too far backward at the transfer point, i.e., at too small of an angle, arm 75 will swing downward, in the direction of arrow 78, so that sensor 79 and sensor 80 will be uncovered resulting in a signal being fed to motor 24 to at least momentarily slow down the movement of chains 22 on conveyor 11. This will have the effect of straightening up or increasing the angle of the products on conveyor 11.

I claim:

1. A method of arranging a multitude of separated articles into a batch of articles, comprising the steps of:
    a) moving a plurality of separated articles resting freely in tandem on a first conveyor toward an output end of said first conveyor with a leading edge of each article generally transverse tot he direction of travel of said article; then
    b) transferring each article in sequence from the output end of said first conveyor downward to the receiving end of a second conveyor so that its leading edge contacts said second conveyor;
    c) restraining the ledge of an article which is transferred to said second conveyor to keep said article partially upright angled rearward on said second conveyor;
    d) moving said partially upright article on edge on said second conveyor so that successive articles reaching said second conveyor reverse shingle one behind the other on edge to form a reverse-shingled batch of articles consisting of predetermined number of articles; and then
    e) advancing said batch of reverse-shingled articles on edge on said second conveyor towards an output end of said second conveyor to space said batch from the next article which is transferred to said second conveyor from said first conveyor.

2. The method of arranging separated articles into a batch of articles as described in claim 1 wherein step (b) includes the step of forming a space behind each rearward angled article as it is transferred to the second conveyor for receiving the leading edge of the next successive article from the first conveyor.

3. A method of arranging articles into a batch of articles as described in claim 1 wherein said articles are randomly spaced on said first conveyor.

4. The method of arranging separated articles into a batch of articles as described in claim 1 further including the steps of:
    counting the number of successive articles that reach the second conveyor; then
    advancing the batch of reverse-shingled articles on edge in step (e) when the counted number reaches a preset quantity.

5. The method of arranging batches of articles as described in claim 4 further including the steps of:
    moving the batch of articles on edge from said second conveyor into a container having closed top, bottom, side and back end walls through an open front end of said container; and
    bowing the top wall of said container inward to guide the reverse-shingled batch of articles while being inserted into the container.

6. Apparatus for arranging articles into batches of articles, comprising:
    a) first conveyor means having an input end and an output end for transporting to the output end a multitude of separated articles resting freely on said first conveyor means in tandem with a leading edge of each article generally transverse to the direction of travel of said first conveyor means;
    b) second conveyor means having an input end and an output end, the input end of said second conveyor means located adjacent and below the output end of said first conveyor means;
    c) means for transferring each article that reaches the output end of said first conveyor means partially upright onto the input end of said second conveyor means so that the article is angled rearward with the leading edge of the article in contact with said second conveyor means;
    d) keeper lug means on said second conveyor means for contacting the leading edge of the first article of a batch of articles that is transferred to said second conveyor means to maintain said first article partially upright angled rearward on said second conveyor means;
    e) said second conveyor moving said keeping lug means so that successive articles transferred from said first conveyor means onto said second conveyor means are reverse-shingled on edge one behind another on said second conveyor means;
    f) pusher arm means on said second conveyor means;
    g) means for moving said pusher arm means into contact with the last reverse-shingled article on said second conveyor means to group said articles into a batch and to move the reverse-shingled batch of articles on edge toward the output end of said second conveyor means while articles are being transferred onto said second conveyor means from said first conveyor means.

7. Apparatus for arranging articles into batches as described in claim 6 wherein said means for transferring each article to said second conveyor means includes:
    wheel means at the output end of said first conveyor means for forming a space behind each article as it is transferred to said second conveyor means for receiving the leading edge of the next article being transferred from said first conveyor means to said second conveyor means.

8. Apparatus for arranging articles into batches as described in claim 7 wherein said wheel means comprises:

a freely rotatable wheel having a plurality of circumferentially spaced lobes;

each of said lobes having a generally concave edge directed generally radially inward and a generally arcuate convex edge, said concave edge for contacting the leading edge of an article as it reaches the output end of said first conveyor means and said convex edge for contacting the backside of the last article transferred from said first conveyor to said second conveyor, the leading edge of the article contacting said concave edge of said wheel to rotate said wheel so that the convex edge contacts the back side of the last-transferred article on said second conveyor to control and form a space behind said last-transferred article for receiving the leading edge of the next article being transferred from said first conveyor means to said second conveyor means.

9. Apparatus for arranging articles into batches as described in claim 6 further including:

a container having a chamber formed by a top wall, a bottom wall, side walls and a closed back end wall with an open front end providing an entry into said chamber, said front end facing the end of said second conveyor;

means for moving the reverse-shingled batch of articles on edge from said second conveyor into said container through said open front end; and means for inwardly bowing the top wall of said container for guiding said batch of articles into said container while said batch of articles is being moved into said container.

10. Apparatus for arranging articles into batches as described in claim 8 wherein said wheel is mounted on a shaft which is generally orthogonal t the line of travel of the products, and further including means for adjustably moving said wheel shaft along the line of travel of the articles.

11. Apparatus for arranging articles into batches as described in claim 6 wherein said second conveyor means includes endless chain means and means for adjustably mounting said keeper lug means and said pusher arm means on said endless chain means, said endless chain means cyclically returning said keeper lug means and said pusher arm means to the input end of said second conveyor.

12. Apparatus for arranging articles into batches as described in claim 11 further including loading means for contacting the last article in a reverse-shingled batch of articles to rapidly advance the batch of articles downstream to the output end of said second conveyor.

13. Apparatus for arranging articles into batches as described in claim 12 wherein said loading means comprises ram means and further including means for reciprocably operating said ram means to rapidly advance downstream each of the reverse-shingled batches of articles.

14. Apparatus for arranging articles into batches as described in claim 6 further including an elongated rigid bar adjustably attached to said second conveyor, said bar extending lengthwise downstream over said second conveyor, said bar contacting the upper edges of the batches of articles for preventing said upper edges from rising above the elevation of said bar.

15. Apparatus for arranging articles into batches as described in claim 14 further including:

an arm pivotably attached to said bar at about the input end of said second conveyor for detecting the elevation of the upper edge of each article; and means responsive to said arm for selectively controlling the speed of the chains and belts of said second conveyor for maintaining the elevation of said article upper edge at a desired level.

16. Apparatus for arranging articles into batches of articles as described in claim 6 wherein said articles are randomly spaced on said first conveyor.

* * * * *